United States Patent [19]

Newski et al.

[11] Patent Number: 5,129,689

[45] Date of Patent: Jul. 14, 1992

[54] THREADED TUBULAR CONNECTION WITH OUTER THREADED RING

[75] Inventors: Milagro Newski; Alejandro Newski; Olegario Rivas, all of Caracas, Venezuela

[73] Assignee: Intevep, S.A., Caracas, Venezuela

[21] Appl. No.: 624,580

[22] Filed: Dec. 10, 1990

[51] Int. Cl.$^5$ .............................. F16L 15/00
[52] U.S. Cl. ........................ 285/333; 285/334.2; 285/334.3; 285/390; 285/398
[58] Field of Search .............. 285/333, 334.1, 334.2, 285/334.3, 370, 371, 397, 390, 398, 55

[56] References Cited

U.S. PATENT DOCUMENTS

| | | | |
|---|---|---|---|
| 556,215 | 3/1896 | Schmidt | 285/334.3 |
| 595,437 | 12/1897 | Greenfield | 285/55 X |
| 1,568,993 | 1/1926 | Newsom | 285/55 |
| 2,487,241 | 1/1947 | Hilton | 285/334.2 |
| 3,172,934 | 7/1960 | Krieg | 285/55 X |
| 3,253,841 | 12/1963 | Ahmad | 285/371 |
| 3,472,533 | 7/1968 | Turner | 285/371 |
| 3,620,555 | 11/1971 | Hinds | 285/55 |
| 4,537,406 | 8/1985 | Hirasuna et al. | 285/334.2 |
| 4,568,113 | 2/1986 | Axford et al. | 285/334 |
| 4,623,173 | 11/1986 | Handa et al. | 285/334 |

Primary Examiner—Randolph A. Reese
Assistant Examiner—Tim Aberle
Attorney, Agent, or Firm—Bachman & LaPointe

[57] ABSTRACT

A pipe union device and method in which terminal ends of well casing, well production tubing or drill pipe are connected in fluid type fashion by stressing compressively a spacer disposed between terminal ends of adjacent lengths of tubing.

13 Claims, 2 Drawing Sheets

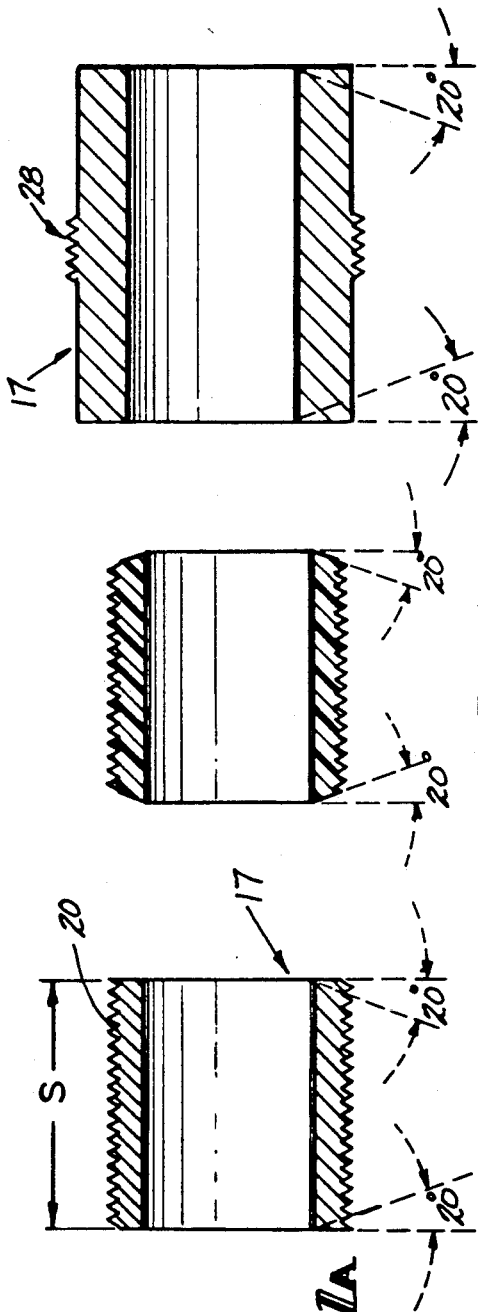
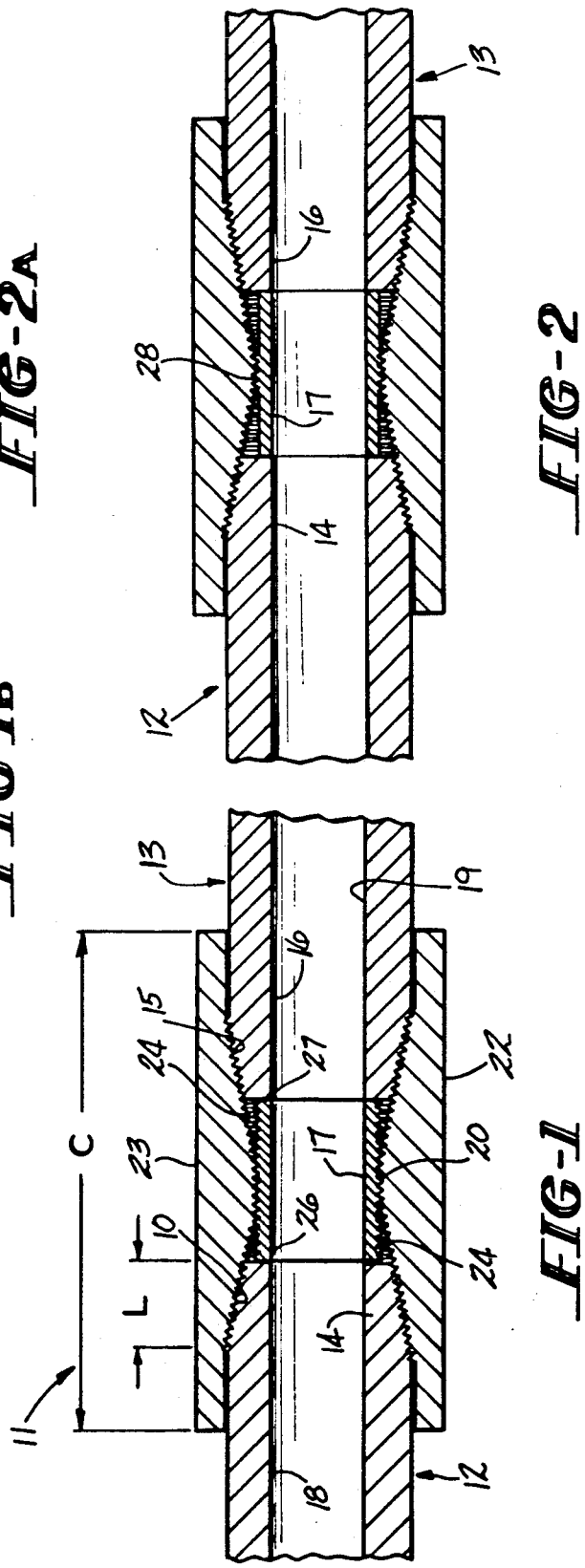

THREADED TUBULAR CONNECTION WITH OUTER THREADED RING

BACKGROUND OF THE INVENTION

The present invention relates to oil well production and relates in particular to a novel union structure between lengths of well production casing, tubing or drill pipe.

Prior art unions or connections between lengths of tubing frequently involve internal offsets or steps which result in a discontinuity in the interior wall of the tubing. Such an obstruction creates a choke or throttling effect restricting the flow of fluid materials pumped through the tubing.

This restriction results in turbulence which generates corrosion and erosion problems leading to weakening the union and thus creating a weak link in production tubing or drill pipe, as the case may be.

The problem is magnified when the fluid flowing through the tubing contains sand or other finely divided abrasive material.

In some prior art arrangements, the erosion problem is solved by introducing an inner tubular liner of high quality, erosion resistant metal wherein the liner segments abut one another to provide a straight through unobstructed flow path.

U.S. Pat. No. 4,568,113, issued Feb. 4, 1986 to Axford et al., is representative of these prior art structures.

SUMMARY OF THE INVENTION

In contrast to prior art structures the present invention relates to an improved union or connection for lengths of well casing, well production tubing or drill pipe.

In particular, the present invention provides a high strength joint which is of simple design, has long life and is easy to assemble.

A further feature of the invention is the provision of pipe line union whose internal wall structure is "straight through", free of annular steps, recesses or other obstructions which would create turbulence in fluids flowing past the union resulting in erosion of the wall.

A further feature of the invention is the provision of a union in a pipe string wherein the pipe is free of internal liners for protecting the main tubular structure from erosion.

A still further feature of the invention is the provision of an inexpensive union for a pipe string useful in oil well production tubing and in drill pipe which provides a conduit for drilling mud.

A union embracing certain features of the present invention may comprise an assembly of elements including opposed, spaced terminal ends of two lengths of tubing, a spacer disposed between said ends to create a continuous, straight through flow path of uniform internal diameter from one length of tubing to the other via said spacer, a portion of an external surface of said spacer and said terminal ends of said tubing being formed with threads and an external collar surrounding said ends and said spacer, said collar being formed with internal threads which cooperate with the threads of said spacer and said tubing to bind all elements of the union into a rigid fluid tight assembly.

The invention also provides a method of effecting a high strength, tight seal between opposed ends of tubular members.

Other features and advantages of the invention will become more apparent from an examination of the succeeding specifications when read in conjunction with the appended drawings in which;

BRIEF DESCRIPTION OF THE DRAWING

FIGS. 1 and 1A show a first embodiment of the union structure and FIG. 1B shows a second embodiment of the union structure.

FIGS. 2 and 2A show an alternative embodiment; and

DESCRIPTION OF THE PREFERRED EMBODIMENTS

Figure 3A:
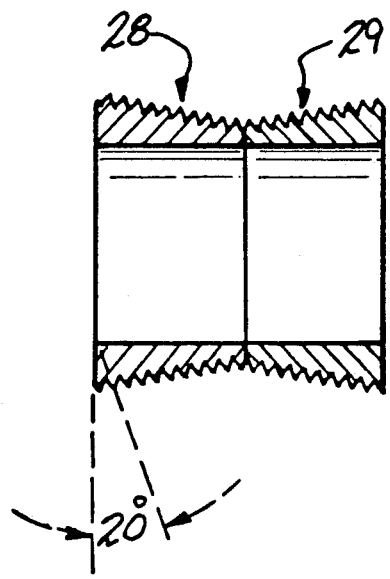
FIGS. 3 and 3A show a still further embodiment of the union assembly.

Referring to FIGS. 1 and 1A, a union assembly indicated generally by the reference numeral 11 includes opposed tubes 12 and 13 having terminal ends 14 and 16 spaced apart by a spacer 17.

The internal diameters 18 and 19 of the tubes 12 and 13 and the internal diameter 21 of the spacer 17 are identical so that the tubes and the spacer form a coaxial "straight through" flow path free of obstructions, recesses or stepped surfaces.

The terminal ends 14 and 16 of the tubes 12 and 13 are threaded as indicated at 10 and 15. In the FIG. 1 embodiment, the threads 10 and 15 are formed on a tapered surface and are of uniform root. In some embodiments the threads maybe pipe threads.

The spacer 17, having a uniform wall thickness, is formed with a continuous external thread 20 which is of the same "hand" as the threads 10 and 15 on the terminal ends 14 and 16 of the tubes 11 and 12.

A collar 22 formed with an internal threaded contour matching and cooperating with the threads 10, 15 and 20.

To accommodate the tapered surface on which the threads 10 and 15 are formed while insuring threaded contact with at least a portion of the spacer threads 20 the collar 22 is formed with converging tapers mating with the tapered surfaces on tube ends 14 and 16.

As is most apparent in FIG. 1 the converging tapers on the collar 22 creates a bulge defining a convex or thickened wall as indicated at 23 thus insuring threaded engagement between the collar and a central portion of the spacer with end portions of the spacer free of threaded engagement as indicated at 24.

The union arrangement of FIG. 1, as well as the alternative embodiments, to be described in detail hereinafter, is assembled by first threading the spacer 17 to a central position within the collar 22. When the spacer is threaded from end to end, as is apparent in FIG. 1A, threads at the opposed ends of the collar do not engage the adjacent threads on the collar.

Thereafter the tubes 12 and 13 are threaded into opposed ends of the collar and "turned up" tightly to place the spacer 17 under a compressive stress to establish a fluid tight seal at the junctions 26 and 27 between the tubes and the spacer. That is, the collar 22 acts as a jackscrew to develop pressure.

In the alternative, and in less expensive fashion, the spacer 17 is formed with threads solely in the central portion thereof as indicated by the reference numeral 28 in FIGS. 2 and 2A.

Frequently it is desirable to bevel the ends of the spacer as shown in dashed lines in FIGS. 1A and 2A so that there is circular line contact with the ends of the tubes.

Thus, when the tube ends are advanced into the collar and into contact with the spacer to stress the spacer compressively an "upsetting" or swaging action occurs greatly enhancing the integrity of the fluid tight seal as the beveled ends of the spacer are "cold worked".

While a bevel angle of 20° is optimum, angles ranging from 15 to 25 degrees are satisfactory depending upon the properties of the materials used.

In general, the union assembly is manufactured of metallic materials.

However, it has been found that under certain conditions and depending upon the application to which the union assembly is employed the spacer can be manufactured from non-metallic material such as fluorocarbon polymers (TEFLON) and fluoroelastomer copolymers (VITON).

Figure 3:
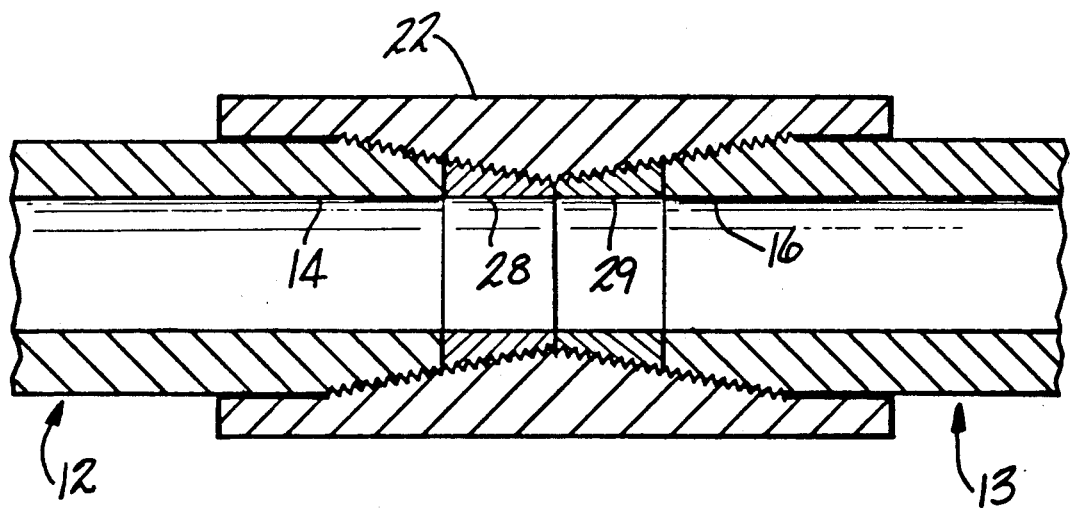

FIGS. 3 and 3A show an alternative configuration of the spacer in which the spacer defines two elements 28 and 29 each of which is appropriately tapered to match the tapers of tube ends 14 and 16 and to provide full threaded contact with the matching threads of the collar 22.

The dimensions of the elements of the union device are limited. The length S of the spacer is equal to C-2L where C is the length of the collar 22 and L is the length of the threaded portion of a tube end.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope a defined by the claims.

What is claimed is:

1. A method of enhancing a seal between abutting ends of unlined tubular members comprising the steps of:
    providing two lengths of tubing wherein each of said two lengths of tubing is provided with substantially the same internal diameter and external thread;
    providing a spacer having a uniform internal diameter the same as the internal diameters of said two lengths of tubing and an eternal thread;
    providing an external collar having an internal thread adapted to cooperate with the threads on said lengths of tubing in said spacer;
    threading said spacer into said external collar; and
    thereafter threading one of said two lengths of tubing into said external collar on either side of said spacer wherein the two lengths of tubing are drawn toward one another to place the spacer under compressive stress to effect a seal so as to create a junction between said two lengths of pipe and said spacer wherein the junction forms a continuous, straight through flow path of uniform internal diameter extending through one length of tubing to the other length of tubing via said spacer.

2. The method of claim 1 in which the compression step is effected by a jackscrew engaging said tube ends threadedly.

3. The method of claim 1 wherein the spacer is fabricated of thermoplastic material.

4. The method of claim 1 including the steps of forming a bevel on opposed ends of the spacer such that the spacer makes circular line contact with said ends of said lengths of tubing.

5. A pipeline union device comprising an assembly of elements including opposed, spaced ends of two lengths of tubing, each of said two lengths of tubing having substantially the same internal diameter;
    a hollow spacer having an internal diameter substantially the same as the internal diameter of said two lengths of tubing disposed between said ends to create at the junction between said two lengths of tubing and said spacer a continuous, straight through flow path of uniform internal diameter extending through one length of tubing to the other length of tubing via said spacer;
    a portion of an external surface of said spacer and the ends of said lengths of tubing being formed with complementary threads;
    an external collar surrounding said ends of said lengths of tubing and said spacer; and
    said collar being formed with internal threads which cooperate with threads of said spacer and said lengths of tubing to bind all elements of the union device into a rigid fluid tight assembly.

6. The device of claim 5 in which the spacer is formed with a bevel at opposed ends whereby the spacer makes circular line contact with the tube ends.

7. The device of claim 5 of which the spacer is fabricated of a thermoplastic material.

8. The union device of claim 5 in which the maximum length S of the spacer is no greater than the length C of the collar less two times the length L of the threaded portion of a tube end.

9. The device of claim 5 in which the spacer is formed with threads extending throughout its external surface.

10. The device of claim 5 in which the ends of said tubing have tapered walls and said collar is formed with converging tapers mating with the tapers of said ends whereby the collar threads engage at least a portion of the threads of said spacer.

11. The device of claim 10 in which the spacer is formed with external threads solely in the portion thereof which is in threaded engagement with the collar.

12. The device of claim 10 in which the spacer defines at least two pieceparts, each said piecepart having a tapered surface which defines an extension of the tapered surfaces of adjacent ends of said tubing.

13. The device of claim 12 in which the tapered surfaces of the spacer pieceparts are threaded throughout their external surfaces whereby the threads of the spacer parts engage the threads of said collar fully.

* * * * *

UNITED STATES PATENT AND TRADEMARK OFFICE
CERTIFICATE OF CORRECTION

PATENT NO. : 5,129,689
DATED : July 14, 1992
INVENTOR(S) : Milagro Newski, et al It is certified that error appears in the above-identified patent and that said Letters Patent is hereby corrected as shown below:

Column 3, Claim 1:

Line 47, before "the same" insert --substantially--;

Line 48, delete "eternal" and substitute --external--;

Signed and Sealed this

Nineteenth Day of October, 1993

Attest:

BRUCE LEHMAN

Attesting Officer

Commissioner of Patents and Trademarks